(12) United States Patent
Yuan (10) Patent No.: US 9,834,108 B2
(45) Date of Patent: Dec. 5, 2017

(54) SYSTEM AND METHOD FOR CONTACTING VEHICLE VIA ELECTRIC VEHICLE SUPPLY EQUIPMENT

(71) Applicant: Honda Motor Co., Ltd., Minato-ku, Tokyo (JP)

(72) Inventor: Alvin T Yuan, Carson, CA (US)

(73) Assignee: Honda Motor Co., LTD., Tokyo (JP)

( * ) Notice: Subject to any disclaimer, the term of this patent is extended or adjusted under 35 U.S.C. 154(b) by 113 days.

(21) Appl. No.: 15/149,840

(22) Filed: May 9, 2016

(65) Prior Publication Data
US 2017/0320399 A1    Nov. 9, 2017

(51) Int. Cl.
| | |
|---|---|
| B60L 11/18 | (2006.01) |
| H04W 68/00 | (2009.01) |
| H02J 7/00 | (2006.01) |
| H04W 88/02 | (2009.01) |

(52) U.S. Cl.
CPC ....... B60L 11/1846 (2013.01); B60L 11/1816 (2013.01); B60L 11/1842 (2013.01); H02J 7/0027 (2013.01); H04W 68/005 (2013.01); H04W 88/02 (2013.01)

(58) Field of Classification Search
CPC .................................................. B60L 11/1846
USPC ........................................................ 320/109
See application file for complete search history.

(56) References Cited

U.S. PATENT DOCUMENTS

| | | | |
|---|---|---|---|
| 8,447,543 B2* | 5/2013 | Dickinson | B60L 11/1816 702/58 |
| 9,135,612 B1* | 9/2015 | Proctor, Jr. | G06Q 20/202 |
| 9,646,435 B2* | 5/2017 | Outwater | G06Q 30/06 |
| 9,754,300 B2* | 9/2017 | Kempton | B60L 11/1824 |
| 2006/0204056 A1 | 9/2006 | Steinberg et al. | |
| 2009/0024309 A1* | 1/2009 | Crucs | G08G 1/015 701/118 |
| 2009/0026254 A1 | 1/2009 | Johnson et al. | |
| 2012/0323643 A1 | 12/2012 | Volz | |
| 2013/0085596 A1 | 4/2013 | Shani | |
| 2013/0325564 A1 | 12/2013 | Kwong | |
| 2014/0159660 A1* | 6/2014 | Klose | B60L 11/1838 320/109 |
| 2015/0039173 A1 | 2/2015 | Beaurepaire et al. | |
| 2015/0130641 A1 | 5/2015 | Rahman et al. | |
| 2015/0202975 A1 | 7/2015 | Solomon et al. | |
| 2016/0019492 A1 | 1/2016 | Juhasz et al. | |
| 2016/0031338 A1 | 2/2016 | Penilla et al. | |
| 2016/0117866 A1* | 4/2016 | Stancato | G07B 15/00 705/5 |
| 2016/0280082 A1* | 9/2016 | Tajima | B60L 11/1812 |
| 2016/0313731 A1 | 10/2016 | Leppanen et al. | |
| 2016/0339792 A1* | 11/2016 | Khoo | B60L 11/1825 |
| 2017/0164178 A1* | 6/2017 | Anjum | H04W 4/008 |

FOREIGN PATENT DOCUMENTS

| | | |
|---|---|---|
| KR | 2013-0127226 A | 11/2013 |
| WO | WO 03/009251 A1 | 1/2003 |

* cited by examiner

Primary Examiner — M'Baye Diao
(74) Attorney, Agent, or Firm — Arent Fox LLP (57) ABSTRACT

A method and system of notifications for an electric vehicle are provided. A method of notification includes receiving, from an electric vehicle supply equipment (EVSE), a charge for a first vehicle. The method may further include scanning, by the first vehicle, an identifier of a second vehicle parked in tandem with the first vehicle. The method may also include sending, via the EVSE, by the first vehicle, a notification request including the identifier of the second vehicle.

20 Claims, 7 Drawing Sheets

SYSTEM AND METHOD FOR CONTACTING VEHICLE VIA ELECTRIC VEHICLE SUPPLY EQUIPMENT

BACKGROUND

Existing infrastructure for electric vehicle charging is often limited. For example, although some parking facilities may provide charging stations, the number of electric vehicles desiring to use the charging stations may be greater than the number of charging stations.

Additionally, parking in urban environments is often limited. Multi-level parking garages increase parking space by allowing multiple vehicles to occupy the same geographic coordinates. Multi-level parking garages, however, also use a lot of available space for roads and ramps that are needed to access each level. Further, multi-level parking garages, for example, those located beneath office buildings, may not have optimal dimensions for parking cars. Moreover, as parking facilities add charging stations to accommodate electric vehicles, fewer parking spaces may be available for other vehicles.

One solution for increasing parking spaces is to allow tandem parking. In a tandem parking scenario two or more cars are parked end-to-end. Walls, columns or other vehicles may be located to the sides of the tandem parked cars. Accordingly, tandem parking increases the number of vehicles that may be parked in a given space. Usually, the first car to park in a tandem spot is blocked from exiting the parking spot by a subsequent (e.g., second, third, etc.) car. This creates a situation where the first car waits for a driver(s) of the subsequent car(s) to remove their vehicles before the first car may exit the parking spot. A driver of the first car may be unable to contact the driver(s) of the subsequent car(s) and may be unable to move the first car. Further exasperating this problem, a multi-level parking facility may have poor reception of radio-frequency signals, limiting available communication options.

Tandem parking may also be used in relation to an electric vehicle charging station. A vehicle may park in tandem with a vehicle that is charging. Additionally, electric vehicles requesting to use a charging station may form a queue in tandem with a vehicle currently using the charging station. The tandem vehicles, however, may block the charging vehicle and may not be aware of the timing of when the first vehicle is finished charging.

In view of the foregoing, tandem parking systems and methods that provide the ability to contact the blocking vehicle are provided. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, a method of notification includes receiving, from an electric vehicle supply equipment (EVSE), a charge for a first vehicle. The method may further include scanning, by the first vehicle, an identifier from a second vehicle parked in tandem with the first vehicle. The method may also include sending, via the EVSE, by the first vehicle, a notification request including the identifier for the second vehicle.

According to another aspect of the present disclosure, a method of providing a notification includes detecting, at an EVSE, a first vehicle connected to a charging plug. The method may further include providing an electric charge to the first vehicle via the charging plug according to a charging waveform. The method may also include detecting that the first vehicle is drawing power according to a communication waveform that is different than the charging waveform. The method may additionally include decoding information from the communication waveform. The method may also include communicating a notification based on the decoded information.

In another aspect, the disclosure provides an electric vehicle. The electric vehicle includes a vehicle charger that receives, from an electric vehicle supply equipment (EVSE), a charge for the electric vehicle. The electric vehicle further includes a camera that scans an identifier from a second vehicle parked in tandem with the electric vehicle. The vehicle charger sends, via the EVSE, a notification request including the identifier for the second vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
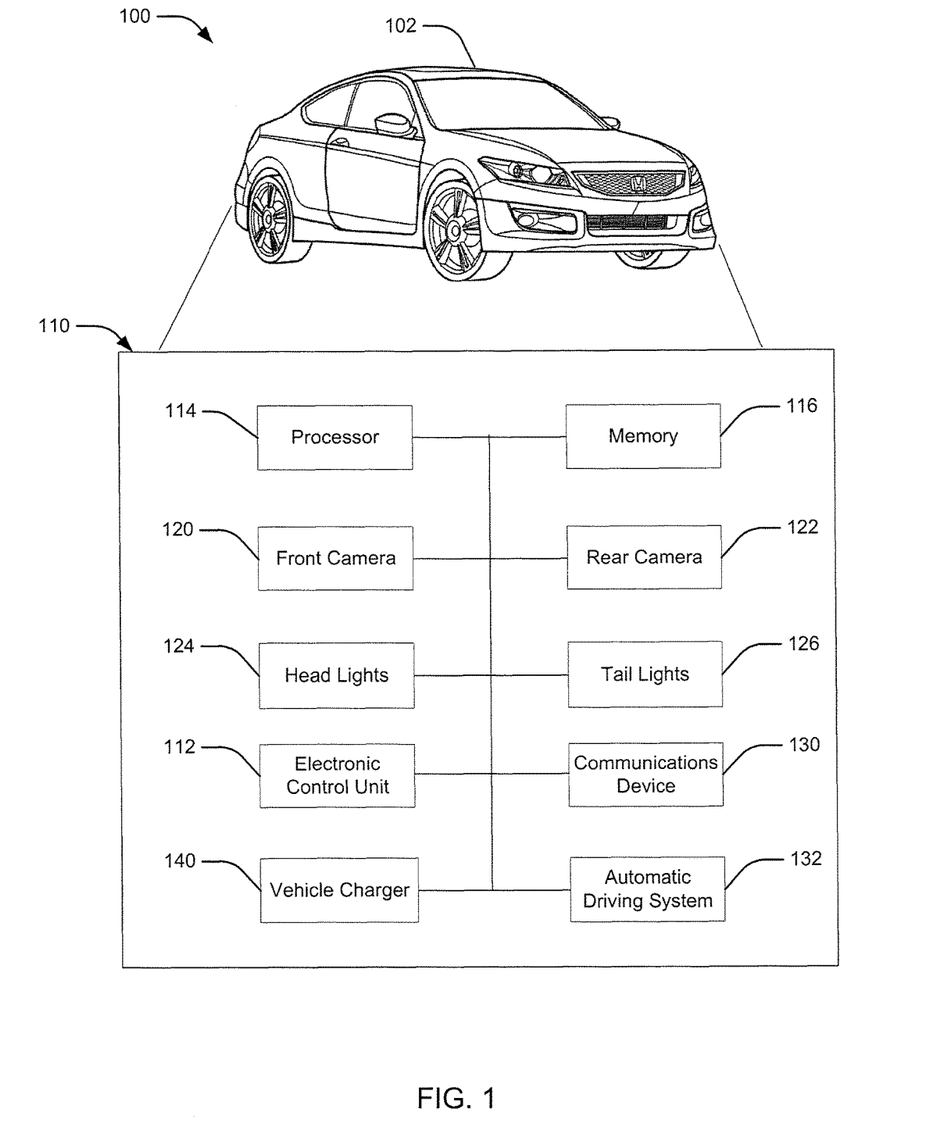
FIG. 1 illustrates a schematic view of an example operating environment of a notification system in accordance with aspects of the present disclosure.

Generally described, the present disclosure provides for parking notifications for tandem parking situations involving an electric vehicle supply equipment (EVSE). Turning to FIG. 1, a schematic view of an example operating environment 100 of a vehicle notification system 110 and example methods according to an aspect of the disclosure is provided. The vehicle notification system 110 may reside within a vehicle 102. The vehicle 102 may be an electric vehicle, which may include any vehicle that uses stored electric power to provide a motive force. For example, an electric vehicle may include a plug-in hybrid vehicle that uses a combination of stored electric power and combustible fuel. The vehicle 102 may include one or more batteries for storing electric power. The components of the vehicle notification system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the vehicle notification system 110 among others including vehicle HVAC systems, vehicle audio systems, vehicle video systems, vehicle infotainment systems, vehicle telephone systems, and the like. The notification system 110 may include a front camera or other image-capturing device (e.g., a scanner) 120 and rear camera or other image-capturing device (e.g., a scanner) 122 that may also be connected to the ECU 112 to provide images of the environment surrounding the vehicle 102, as described in further detail below. The notification system 110 may also include a processor 114 and a memory 116 that communicate with the front camera 120, rear camera 122, head lights 124, tail lights 126, communications device 130, automatic driving system 132, and vehicle charger 140.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle notification system 110.

The vehicle 102 may further include a communications device 130 (e.g., wireless modem and/or transmitter) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®. As described in further detail below, the vehicle charger 140 may also provide communications capabilities, and the communications device 130 may operate in conjunction with the vehicle charger 140.

The vehicle 102 may include a front camera 120 and a rear camera 122. Each of the front camera and the rear camera may be a digital camera capable of capturing one or more images or image streams, or may be another image capturing device, such as a scanner. For example, the rear camera 122 may be a rear parking camera. The rear camera 122 may provide an image of a space directly behind the vehicle 102. For example, the rear camera may be located above a bumper of the vehicle. The front camera 120 may be a dashboard camera. The front camera 120 may capture an image of a space directly in front of the vehicle 102. In a tandem parking scenario, an image captured by the front camera 120 and/or rear camera 122 may include an identifier of a vehicle parked directly in front of or behind the vehicle 102. For example, the image may include a license plate number of the tandem parked vehicle. Additionally, a quick response (QR) code may be located on the vehicle and provide a different identifier such as a vehicle identification number (VIN). The front camera 120 and/or rear camera 122 may also provide the image to an automatic driving system 132, which may include a lane keeping assistance system, a collision warning system, or a fully autonomous driving system, among other systems.

The vehicle 102 may include head lights 124 and tail lights 126, which may include any conventional lights used on vehicles. The head lights 124 and tail lights 126 may be controlled by the vehicle notification system 110 and/or ECU 112 for providing various notifications. For example, the head lights 124 and tail lights 126 may assist with scanning an identifier from a vehicle parked in tandem with the vehicle 102. Further, for example, the head lights 124 and/or tail lights 126 may be activated or controlled to provide desirable lighting when scanning the identity from the vehicle parked in tandem. The head lights 124 and tail lights 126 may also provide information such as an acknowledgment of a remote command (e.g., a move request) by flashing.

The vehicle charger 140 may include hardware for charging the battery of the electric vehicle. In an aspect, the vehicle charger 140 includes a charging receptacle for connecting to a charging plug. The charging receptacle and charging plug may conform to one or more charging standards such as, but not limited to: J1772, SAE-J1772, CHAdeMO, SAE Combo Charging System (CCS), and GB/T 20234. The vehicle charger 140 may include a rectifier for converting alternating current (AC) to direct current (DC). The vehicle charger 140 may include a control circuit for communicating with the EVSE according to an applicable charging standard. For example, the control circuit may indicate properties to be used for charging such as a voltage, current, and duty cycle.

Figure 2:
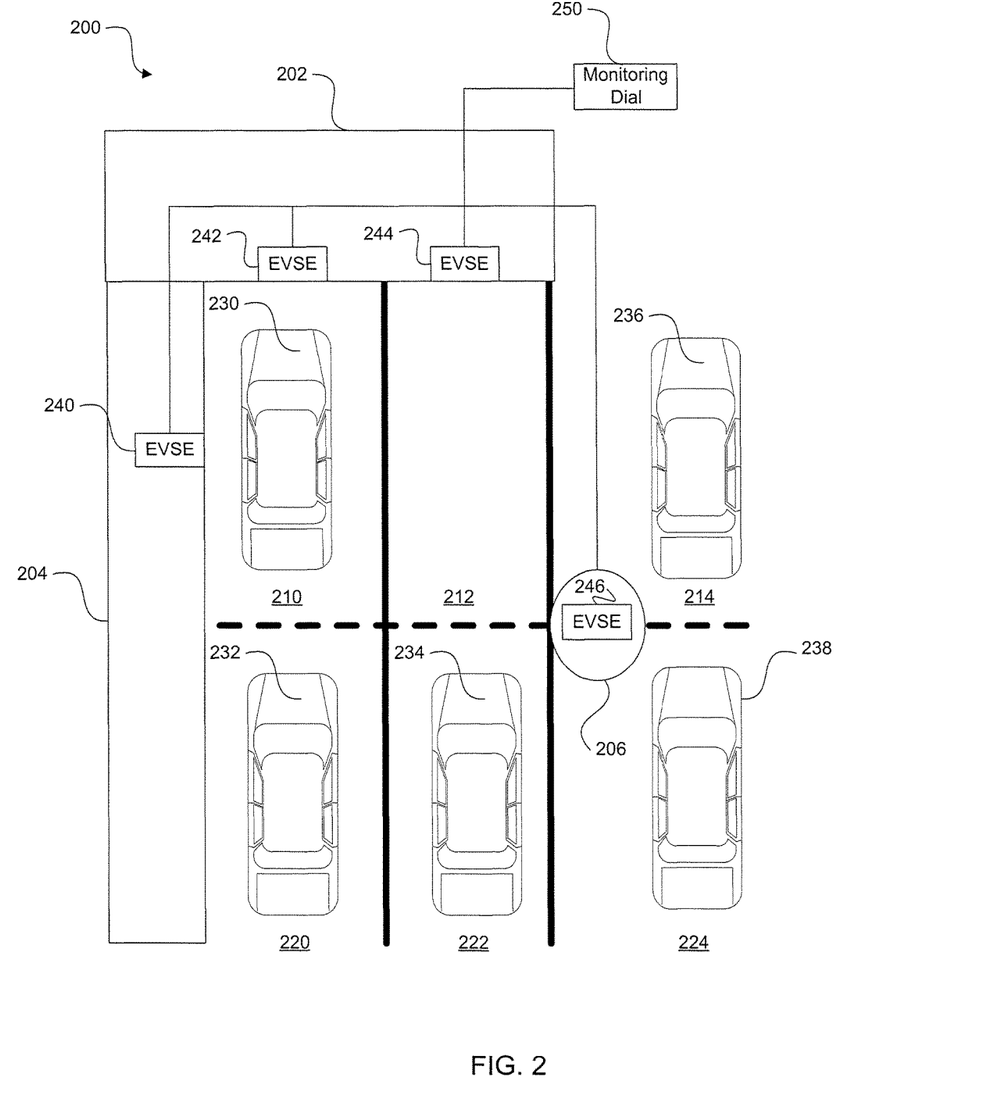
FIG. 2 illustrates an example of a tandem parking scenario involving one or more electric vehicle supply equipment (EVSE) and multiple vehicles in a parking facility.

FIG. 2 illustrates an example of a tandem parking scenario involving one or more EVSEs and multiple vehicles in a parking facility 200. The parking facility 200 may be, for example, a parking garage or a parking lot. The parking facility 200 may include a front boundary 202, which may be, for example, a wall or an edge of the parking lot. The front boundary 202 may also be designated by painted lines, a fence, a barrier or any other indication. The parking facility 200 may also include a side boundary 204. The side boundary 204 may be similar to the front boundary 202, but located along a length of one or more parking spaces. Additionally, the parking facility may include additional obstacles 206 that may limit parking space. For example, obstacles 206 may include support columns, light posts, or other objects that interfere with a regular pattern of parking spaces.

An EVSE may be located in various places within the parking facility 200 to provide for charging of an electric vehicle while it is parked in the parking facility 200. For example, the EVSE 240 may be located along the side boundary 204 next to a parking space. For example, the EVSE 240 may be attached to a wall and include electrical lines passing along or through the wall. Similarly, an EVSE 242 and an EVSE 244 may each be located along the front boundary 202. An EVSE 246 may also be located at an obstacle 206, or form an obstacle 206. For example, an EVSE 240 may be provided as an island adjacent one or more parking spaces. The presence of an EVSE 240 may impose additional parking restrictions on a parking space. For example, a space adjacent an EVSE may be reserved for electric vehicles seeking to use the EVSE.

Each of the EVSE 240, 242, 244, 246 may be operably connected to a monitoring dial 250. The monitoring dial 250 may include power electronics and monitoring equipment to measure electric currents. For example, the monitoring dial 250 may include a power quality analyzer. In an aspect, the monitoring dial 250 may be provided along the main service providing electrical power to the EVSEs. The monitoring dial 250 may analyze power consumption by each of the EVSEs. For example, the monitoring dial 250 may detect a waveform being used to draw power from one or more of the EVSEs. In an aspect, the waveform may be a communications waveform, which may be different than a charging waveform. For example, the communications waveform may be at a different current or voltage. Further, the communications waveform may be encoded with information. For example, a predefined communications waveform may be modulated to convey information. The monitoring dial 250 may detect use of the communications waveform and decode the communications waveform to obtain the information. For example, a vehicle identifier such as a license plate number, a VIN, or a QR code may be communicated using the communications waveform. In another aspect, a communications protocol of a charging protocol may be expanded to allow greater communication options. For example, some charging standards include a communications pin used to signal charging information between the vehicle 230 and the EVSE 240. Such communications may be used to signal a charge state, pack voltage, charge rate, back off indicator, and other charging functions using a power line control, CAN bus, or internet protocol based system. These protocols may be expanded to provide transmission of a vehicle identifier to the EVSE 240, which may forward the vehicle identifier to the monitoring dial 250.

The parking facility 200 may define a plurality of parking spaces arranged in rows and columns. Spaces arranged such that the long sides of the spaces are adjacent may be considered a row of spaces. For example, as illustrated in FIG. 2, a first row of parking spaces includes parking spaces 210, 212, and 214, and a second row of parking spaces includes parking spaces 220, 222, and 224. Spaces arranged such that the short sides of the spaces are adjacent are also interchangeably referred to herein as a column of spaces. For example, as illustrated in FIG. 2, a first column of spaces includes parking space 210 and parking space 220, a second column of spaces includes parking space 212 and parking space 222, and a third column of spaces includes parking space 214 and parking space 224. Vehicles that are parked in spaces within the same column may be considered to be parked in tandem. For example, as illustrated, vehicle 230 and vehicle 232 are parked in tandem. The vehicles 230, 232, 234, 238 may each be an example of the vehicle 102.

Tandem parking offers benefits in terms of space management and efficiency. For example, as illustrated in FIG. 2, the front boundary 202, side boundary 204, and obstacle 206 may prevent placement of an access lane that allows direct access to parking spaces 210, 212, and 214. Allowing tandem parking in the parking facility 200 may increase the total number of parking spaces available within a given area. Tandem parking, however, may present inconveniences for the drivers of the vehicles. For example, the vehicle 230 may be prevented from leaving by the vehicle 232. The vehicle 230 may be unable to drive directly out of the parking space 210. Generally, parking facilities using tandem parking may require drivers who park in a second row (e.g., parking spaces 220, 222, and 224) to leave a key with an attendant or valet so that the vehicle 232 may be moved if the vehicle 230 needs to be moved first. Drivers, however, may feel reluctant or inconvenienced when leaving a key with a garage attendant. Moreover, not all parking facilities may employ an attendant or valet, or it may be inconvenient to locate such a person within the parking facility. Additionally, some drivers may attempt to avoid the tandem parking scenario, for example, by parking in parking space 222 while parking space 212 remains empty. Such parking strategies may reduce the total capacity of the parking facility 200.

Tandem parking may also be useful with respect to an EVSE 240. For example, if there are multiple vehicles that wish to use the EVSE 240, the vehicles may form a queue. Vehicle 232 may park behind vehicle 230 to reserve access to the EVSE 240 once vehicle 230 is finished. Similarly, even if EVSE 240 may only charge one vehicle at a time, the vehicle 238 may park behind the vehicle 236 to reserve access to the EVSE 240 once vehicle 236 finishes charging regardless of whether vehicle 236 remains parked or moves.

By equipping one or more of the vehicles 230, 232, 234, 236 with the notification system 110, the vehicles 230, 232, 234, 236 may help reduce the problems associated with tandem parking. For example, a vehicle 230 may initiate a process for moving the vehicle 232 such that the vehicle 230 may exit the parking space 210.

Figure 3:
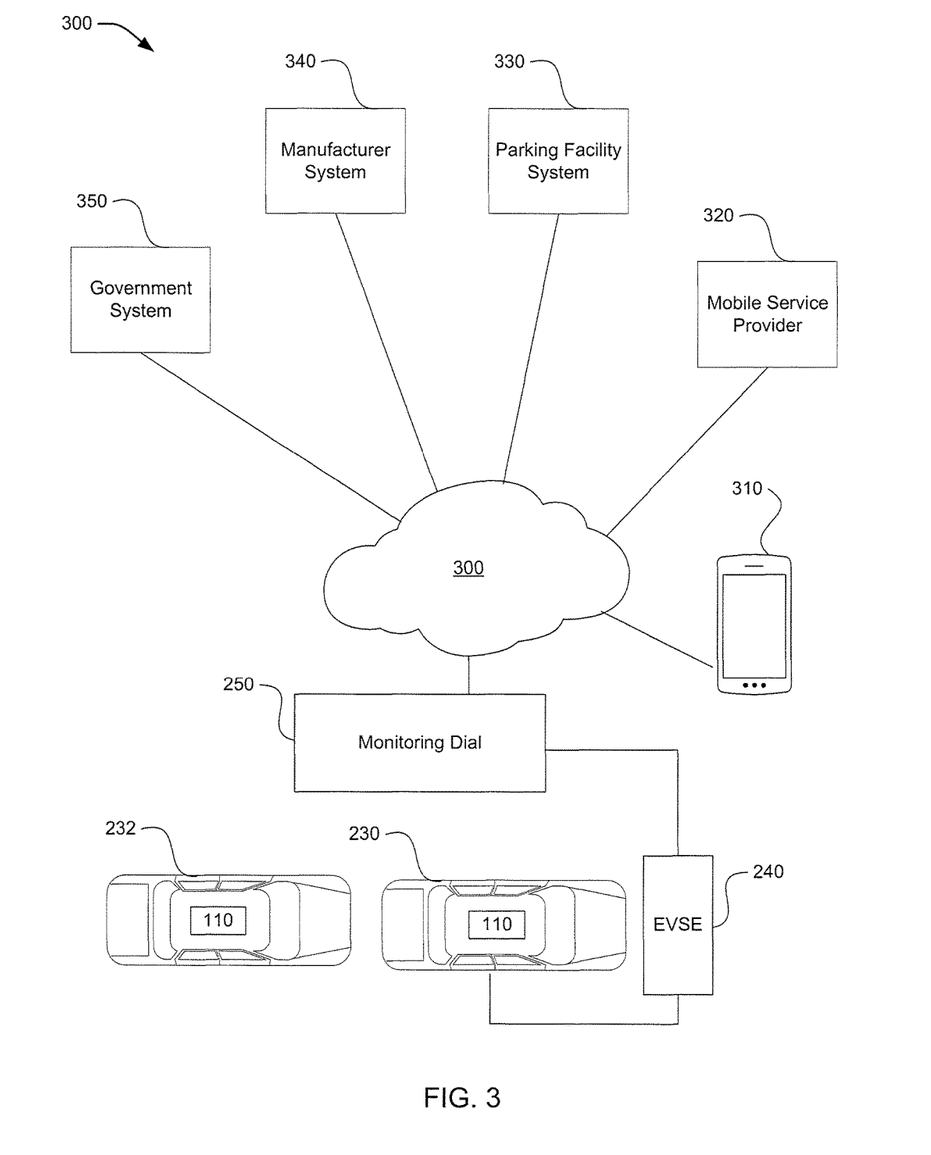
FIG. 3 illustrates an exemplary network for managing a notification system.

FIG. 3 illustrates an exemplary network 300 for managing a notification system 110. The network 300 may be a communications network that facilitates communications between multiple systems. For example, the network 300 may include the Internet. The network 300 may enable the notification system 110 to communicate with a mobile device 310, a mobile service provider 320, a parking facility system 330, a manufacturer system 340, or a government system 350.

The notification system 110 within each vehicle 230, 232 may communicate with the network 300 via the EVSE 240 and monitoring dial 250. Although EVSE 240 is illustrated, any of EVSE 240, 242, 244, or 246 may operate in a similar manner. As an example of such communication, the vehicle charger 140 of the notification system 110 may draw power according to a specialized waveform in order to signal information to the monitoring dial 250. The notification system 110 may, for example, transmit an identifier of a tandem parked vehicle to the monitoring dial 250. The monitoring dial 250 may then forward the identifier of the tandem parked vehicle to the parking facility system 330, the manufacturer system 340, or the government system 350. The notification system 110 may also receive a notification from another vehicle or from the parking facility system 330, manufacturer system 340, or government system 350. For example, the vehicle 232 may receive a notification indicating that the vehicle 232 should be moved. If the vehicle 232 includes an automatic driving system, the vehicle 232 may perform a driverless maneuver to allow the vehicle 230 to exit the tandem position.

The mobile device 310 may be a personal mobile device of a driver of a vehicle. The mobile device 310 may have different contact information than the notification system 110. For example, the mobile device 310 may have a telephone number, a device identifier (e.g., a mobile equipment identifier (MEID), an electronic serial number (ESN), or an international mobile equipment identify (IMEI)), an IP address, an email address, and/or a username associated with a service or application. The mobile device 310 may be registered in association with the vehicle 232 with one or more of the mobile service provider 320, parking facility system 330, manufacturer system 340, or government system 350, or within the vehicle 232. The notification system 110 of vehicle 230 may determine the contact information of the mobile device 310 via one or more registrations. The mobile device 310 associated with the vehicle 232 may receive a notification indicating that the vehicle 232 needs to be moved (e.g., to allow the vehicle 230 to exit the parking space). For example, the notification may be a message asking the driver to return to the vehicle 232 and move the vehicle 232. The notification may also be a message asking for consent for an automatic driving system 132 to move the vehicle 232. Another example message may indicate that the automatic driving system 132 has moved the vehicle 232 to a different parking space.

The mobile service provider 320 may be an entity that provides service to the mobile device 310 and/or the communications device 130. For example, the communications device 130 may include a wireless modem that operates on a cellular network. The mobile service provider 320 may store information regarding the vehicle 232 and/or a driver or mobile device 310 associated with the vehicle 232. For example, the communications device 130 may share an account with the mobile device 310. In another aspect, the mobile service provider 320 may store vehicle information (e.g., license plate number and/or VIN number) for any vehicle including a communications device 130 to which the mobile service provider 320 provides network service. The mobile service provider 320 may provide a portal (e.g., a website or web service) allowing a notification system 110 to contact another notification system 110 or the mobile device 310 based on vehicle information. For example, the notification system 110 of the vehicle 230 may transmit a move request to the mobile service provider 320 including the vehicle information, and the mobile service provider 320 may automatically forward the move request to the vehicle 232 and/or the mobile device 310.

The parking facility system 330 may include a computer system associated with the parking facility 200. The parking facility system 330 may also store registration information associated with each of the vehicles 230, 232, 234, 236 utilizing the parking facility 200. For example, the parking facility 200 may require a driver to register a license plate number and contact information when parking. Accordingly, the parking facility system 330 may act in a similar manner as the mobile service provider 320 described above. That is, the parking facility system 330 may receive a move request from a vehicle 230 and forward the message on to the vehicle 232 and/or the mobile device 310. The parking facility system 330 may also store information regarding a key or parking space associated with the vehicle 232. Accordingly, a valet may respond to the move request by obtaining the key associated with the vehicle 232 and going to the associated parking space to manually move the vehicle 232.

The manufacturer system 340 may include a computer system associated with one or more vehicle manufacturers or dealers. The manufacturer system 340 may also include registration information regarding a vehicle and/or driver. For example, the manufacturer system 340 may include an association of a VIN and/or license plate number with an identifier of the communications system. The manufacturer system 340 may further include contact information for the driver such as a telephone number for the mobile device 310. Accordingly, the manufacturer system 340 may operate in a similar manner to the mobile service provider 320 or parking facility system 330 discussed above.

The government system 350 may include a computer system associated with one or more government entities such as, for example, a department of motor vehicles. The government system 350 may also include registration information regarding a vehicle and/or driver. For example, the government system 350 may include an association of a VIN and/or license plate number with a driver of the vehicle 232. The government system 350 may further include contact information for the driver such as a telephone number for the mobile device 310. Accordingly, the government system 350 may operate in a similar manner to the mobile service provider 320 or parking facility system 330 discussed above.

Figure 4:
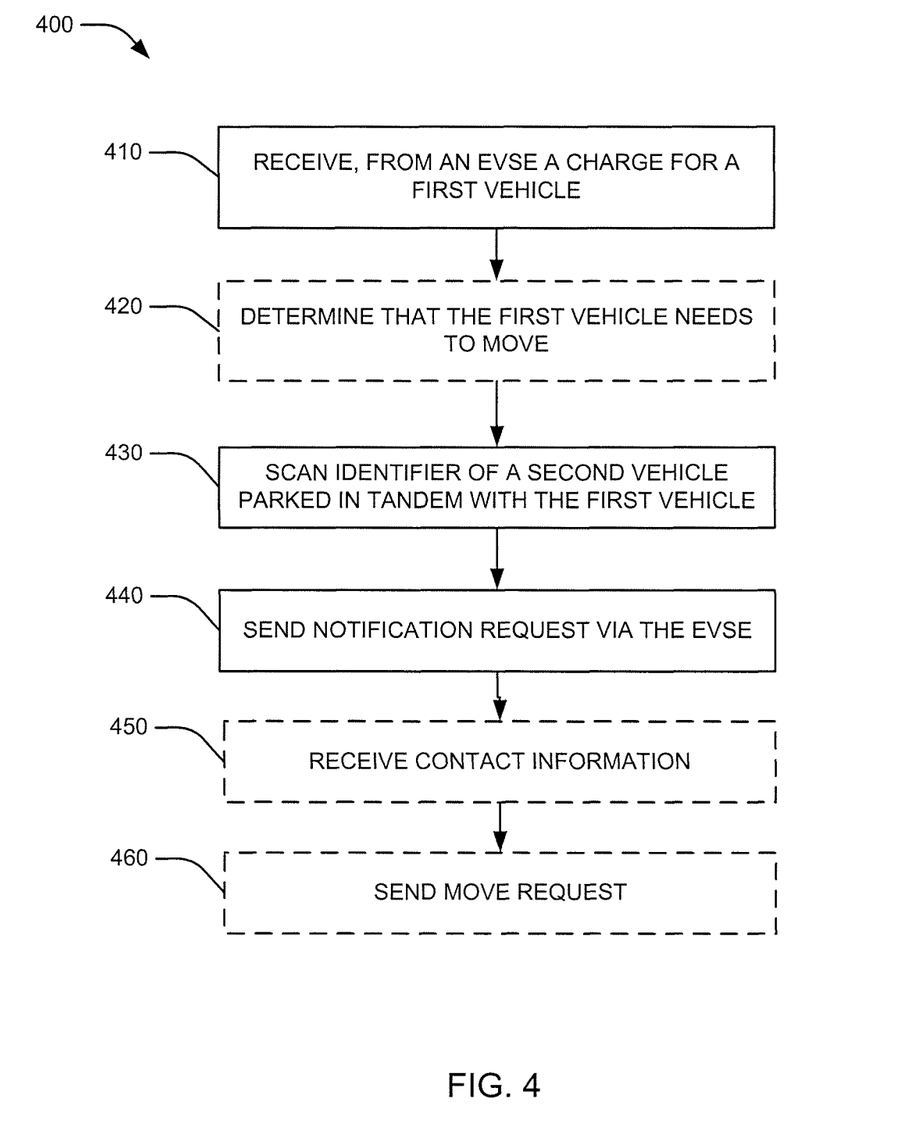
FIG. 4 illustrates a flowchart showing an exemplary method for providing notifications in a tandem parking scenario in accordance with aspects of the present disclosure.

FIG. 4 illustrates a flowchart showing an exemplary method 400 for providing notifications in a tandem parking scenario. The method 400 may be performed by a notification system 110 within a first vehicle 230 that is in a tandem parking position.

In block 410, the method 400 may include receiving, from an EVSE, a charge for a first vehicle. In an aspect, for example, the vehicle 230 may receive a charge from the EVSE 240 via the vehicle charger 140. The charge from the EVSE may be performed according to a charging standard compatible with the vehicle 230 and the EVSE 240.

In block 420, the method 400 may optionally include determining that the first vehicle 230 needs to move. In an aspect, for example, the notification system 110 may receive an indication that the vehicle 230 needs to move from a driver of the vehicle 230. For example, the driver may send a message via an application executing on a mobile device. The message may indicate that the driver intends to leave the parking space at a particular time or within a certain time period. For example, the driver may send the message when the driver has finished a particular task (e.g., making a purchase) at a location near the parking facility 200 and would like to be able to leave the parking space 210 when the driver returns to the vehicle 230. In another aspect, the vehicle 230 may generate an indication that the vehicle needs to move when the vehicle has completed charging. By indicating that the charge is complete, the vehicle 230 may initiate a process that allows another vehicle to use the EVSE 240.

In block 430, the method 400 may include scanning an identifier of a tandem parked vehicle. In an aspect, for example, the notification system 110 may scan the identifier of the tandem parked vehicle using the front camera 120 and/or the rear camera 122. For example, the notification system 110 may activate the head lights 124 and/or tail lights 126 to illuminate the tandem parked vehicle while the front camera 120 and/or the rear camera 122 obtains an image of the tandem parked vehicle. If no vehicle is present in the tandem parking position, the notification system 110 may determine that the vehicle 230 is free to leave parking space 210. The notification system 110 may continue to monitor the front camera 120 and/or the rear camera 122 to determine whether another vehicle enters the parking space 220. The notification system 110 may flash the head lights 124 and/or tail lights 126 or honk the horn if another vehicle attempts to park in parking space 220. If a vehicle is present in the tandem parking space 220, the image may include an identifier of the vehicle. For example, the license plate number of the tandem parked vehicle may be within the image. Another identifier such as a VIN number or QR code may also be within the image. The notification system 110 may analyze the image to determine the identifier using image processing software stored in memory 116 and executed by the processor 114. In another embodiment, scanning the identifier of a tandem parked vehicle may include taking a picture with an mobile device such as a mobile phone including a camera or a camera including communication capabilities. The mobile device may be associated with the first vehicle 230. For example, the mobile device may provide an image or information extracted from the image to the first vehicle 230.

In block 440, the method 400 may include sending a notification request via the EVSE 240. In an aspect, the notification request may include information identifying both the vehicle 232 and the vehicle 230. The information identifying the vehicle 232 may be used to determine contact information for the vehicle 232 or driver thereof. The information identifying the vehicle 230 may be used for authentication to ensure that it is actually necessary to move the vehicle 232. In an aspect, the notification system 110 may send the notification request via the vehicle charger 140. For example, the vehicle charger 140 may draw power according to the communications waveform. The vehicle charger 140 may modulate the communications waveform to convey the vehicle identifiers for the vehicle 230 and/or the vehicle 232. The EVSE 240 and/or monitoring dial 250 may decode the communications waveform to obtain the vehicle identifiers. As another example, the vehicle charger 140 may convey the vehicle identifiers according to an expanded charging protocol using, for example, PLC or CAN physical layer communications with the EVSE 240.

The notification request may be sent from the EVSE 240 or monitoring dial 250 to one or more of the mobile service provider 320, parking facility system 330, manufacturer system 340, or government system 350. In an aspect, the notification message may be sent to an entity that manages a notification service. For example, the parking facility system 330 or manufacturer system 340 may provide an application for submitting notification requests. The parking facility system 330 or manufacturer system 340 may then acquire information from another system if necessary. For example, if a manufacturer system 340 maintains a registry of VIN numbers and communication system identifiers but receives a notification request including only a license plate number, the manufacturer system 340 may contact the government system 350 to obtain a VIN number based on the license plate number.

In block 450, the method 400 may optionally include receiving contact information. In an aspect, for example, the communications device 130 may receive contact information from one or more of the mobile service provider 320, parking facility system 330, manufacturer system 340, or government system 350. The contact information may provide a point of contact for the vehicle 232 or driver thereof. For example, the contact information may be a telephone number, user name, or IP address.

In block 460, the method 400 may optionally include sending a move request to the vehicle 232 or driver thereof using the contact information. In an aspect, for example, the notification system 110 of the vehicle 230 may directly contact the notification system 110 of the vehicle 232 or the mobile device 310. For example, the notification system 110 may transmit the move request as a text message. The move request may include information identifying the vehicle 230, which may be used to authenticate the request. The vehicle 232 or driver thereof may move the vehicle 232 in response to the move request.

In an alternative embodiment, one of the mobile service provider 320, parking facility system 330, manufacturer system 340, or government system 350 may send the move request to the vehicle 232 and/or the mobile device 310.

Figure 5:
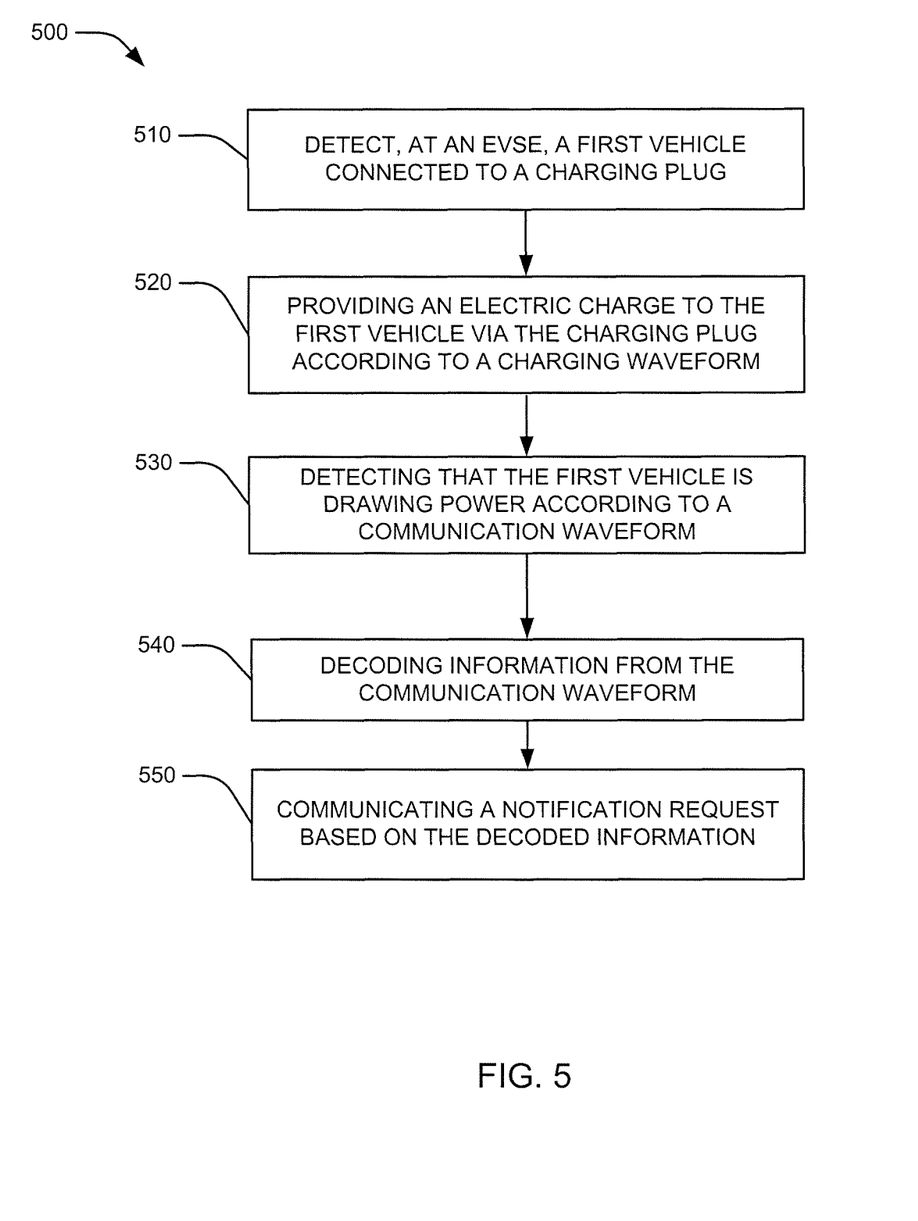
FIG. 5 illustrates a flowchart showing an exemplary method for providing notifications from an electric vehicle supply equipment in accordance with aspects of the present disclosure.

FIG. 5 illustrates a flowchart of an example method 500 for providing notifications from an EVSE. The method 500 may be performed by the EVSE 240 that is connected to a vehicle 230 that is in a tandem parking position that is blocked by another vehicle 232 from exiting the tandem parking position.

At block 510, the method 500 may include detecting, at an EVSE, a first vehicle connected to a charging plug. In an aspect, for example, the EVSE 240 may detect the vehicle 230 connected to a charging plug. For example, a driver of the vehicle 230 may park in the parking space 210 and connect the charging plug of the EVSE 240 to a charging receptacle of the vehicle 230. The EVSE 240 may detect the connection according to a charging standard used by the EVSE 240 and the vehicle 230.

At block 520, the method 500 may include providing an electric charge to the first vehicle via the charging plug according to a charging waveform. In an aspect, for example, the EVSE 240 may provide the electric charge to the vehicle 230. The charging waveform may be based on the charging standard. Further, the EVSE 240 may receive information from the vehicle 230 according to the charging standard regarding the charging waveform. The EVSE 240 may vary the charging waveform according to information received from the vehicle 230.

At block 530, the method 500 may include detecting that the first vehicle is drawing power according to a communication waveform. In an aspect, for example, the EVSE 240 may detect that the vehicle 230 is drawing power according to a communication waveform. The EVSE 240 may receive signaling from the vehicle 230 according to the charging protocol that the vehicle 230 will draw power according to the communication waveform. In another aspect, the EVSE 240 may detect a change in power drawn by the vehicle 230.

In block 540, the method 500 may include decoding information from the communication waveform. In an aspect, for example, the EVSE 240 may decode information from the communication waveform. In one embodiment, the communication waveform itself may indicate information. For example, the communication waveform may represent a coded symbol (e.g., a character). The vehicle 230 may use different communication waveforms to signal the vehicle identifiers, and the EVSE 240 may decode each of the communication waveforms to determine the vehicle identifiers. In another embodiment, the communication waveform may be modulated (e.g., using amplitude modulation) to carry the vehicle identifier. The EVSE 240 may detect the modulation of the communication waveform and demodulate the communication waveform to determine the vehicle identifiers.

In block 550, the method 500 may include communicating a notification request based on the decoded information. In an aspect, for example, the EVSE 240 may communicate the notification request based on the decoded information to one or more of the mobile service provider 320, parking facility system 330, manufacturer system 340, or government system 350. The notification request may be communicated according to any communication technology available to the EVSE 240. In an embodiment, the EVSE 240 may communicate the notification request using a wireline communications system, which may be able to communicate within an underground parking facility.

Figure 6:
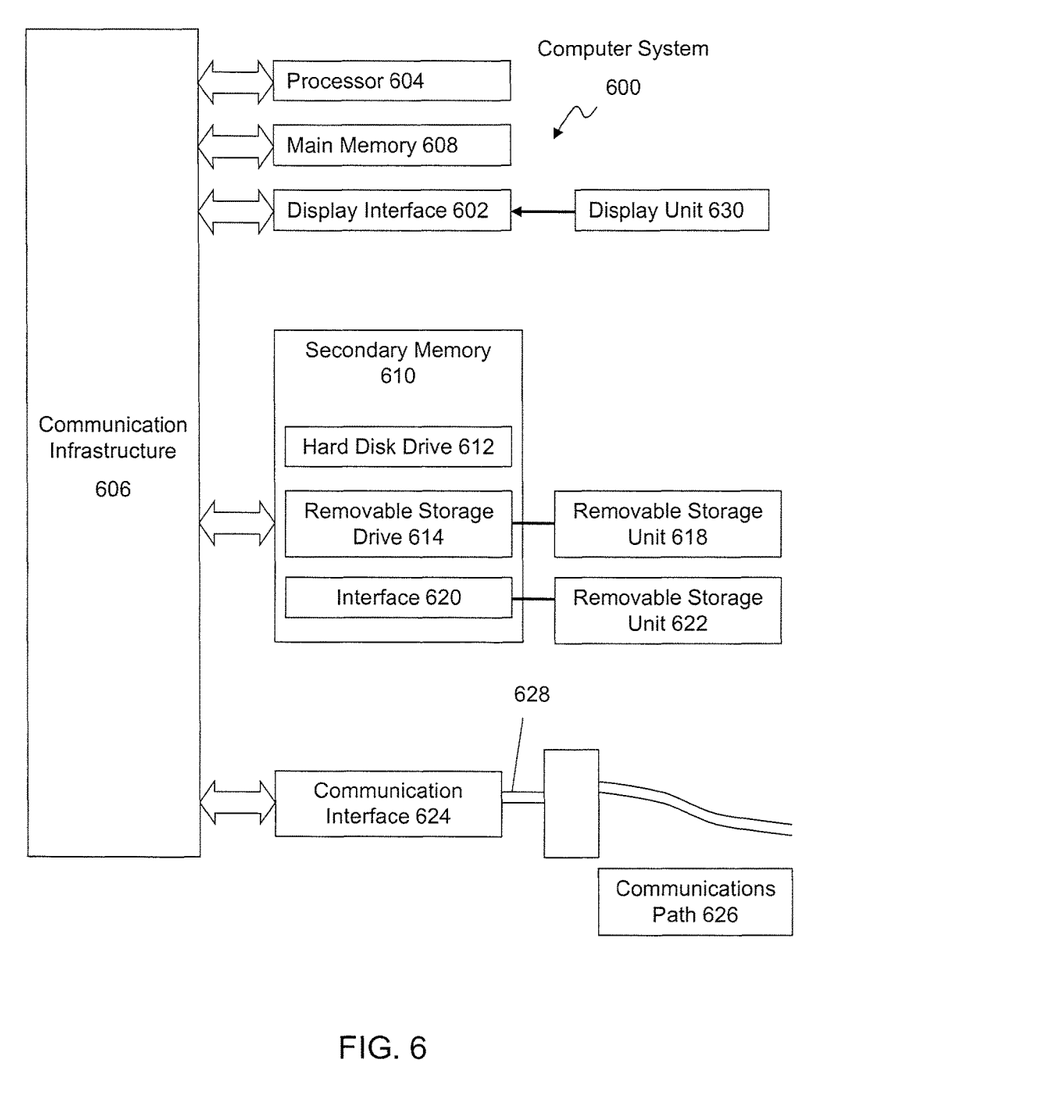
FIG. 6 presents an exemplary system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 6 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and signals 628. These computer program products provide software to the computer system 600. Aspects of the disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software may be stored in a computer program product and loaded into computer system 600 using removable storage drive 614, hard drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 7:
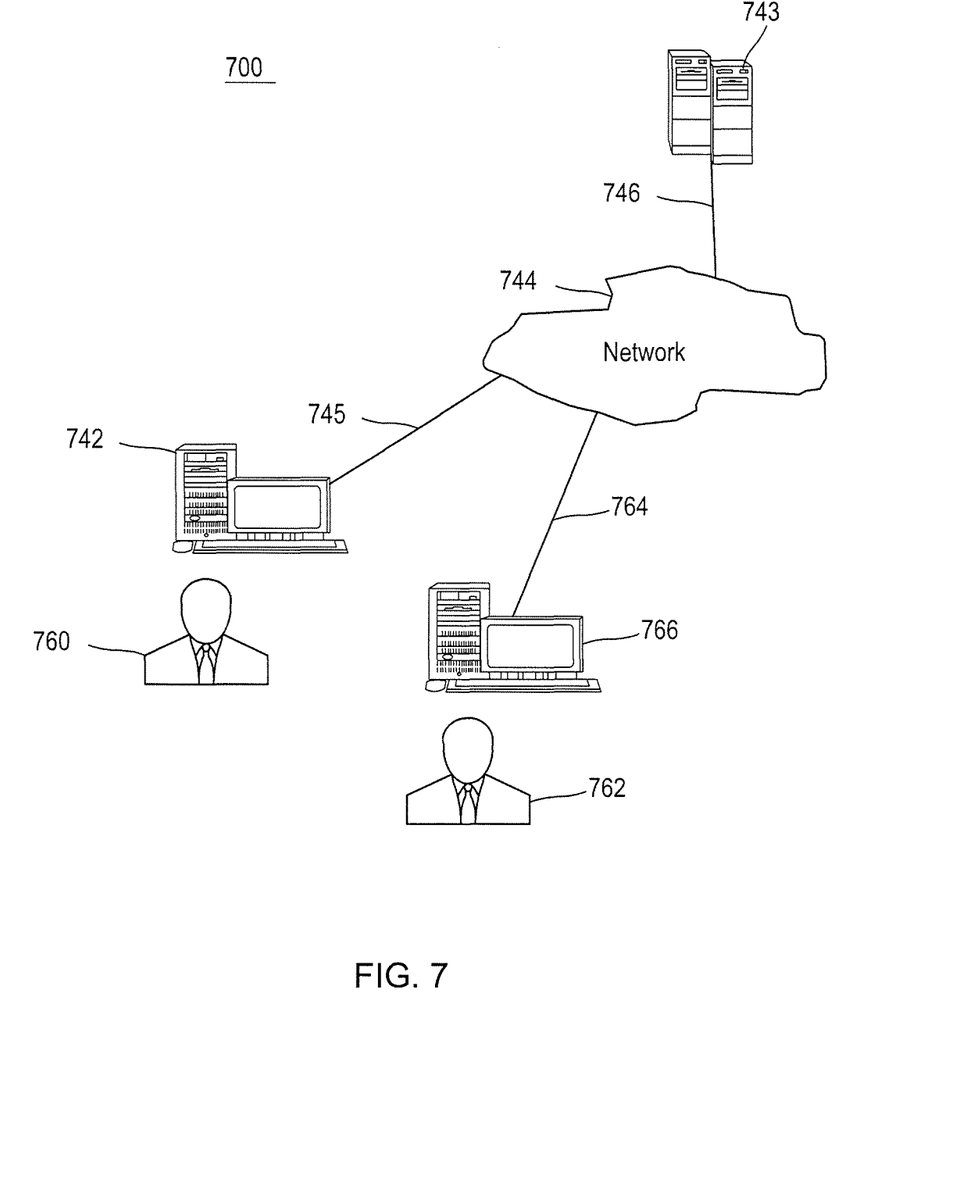
FIG. 7 is a block diagram of various exemplary system components for use in accordance with aspects of the present disclosure.

FIG. 7 is a block diagram of various example system components that may be used in accordance with aspects of the present disclosure. For example, the various components may be within the vehicle 102, or only some of the components may be within the vehicle 102, and other components may be remote from the vehicle 102. The system 700 includes one or more accessors 760, 762 (also referred to interchangeably herein as one or more "users") and one or more terminals 742, 766 (such terminals may be or include, for example, various features of the notification system 110 or the network 300). In one aspect, data for use in accordance with aspects of the present disclosure is, for example, input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of notification comprising:
receiving, from an electric vehicle supply equipment (EVSE), a charge for a first vehicle;
scanning, by the first vehicle, an identifier of a second vehicle parked in tandem with the first vehicle; and
sending, via the EVSE, by the first vehicle, a notification request including the identifier of the second vehicle.

2. The method of claim 1, wherein the sending via the EVSE comprises drawing power from the EVSE according to one or more predefined communication waveforms.

3. The method of claim 2, wherein the one or more predefined communication waveforms are modulated based on the identifier.

4. The method of claim 1, wherein the second vehicle performs a driverless maneuver allowing the first vehicle to exit the tandem position in response to the request.

5. The method of claim 1, further comprising determining that the first vehicle has reached a defined charge level, wherein the scanning is in response to the first vehicle reaching the defined charge level.

6. The method of claim 1, further comprising receiving an indication that a driver of the first vehicle wants to move the first vehicle, wherein the scanning is in response to receiving the indication.

7. The method of claim 1, wherein the scanning comprises:
taking a photograph of the second vehicle using a camera associated with the first vehicle; and
analyzing the photograph to determine the identifier.

8. The method of claim 7, further comprising illuminating the second vehicle with an external light of the first vehicle concurrently with taking the photograph.

9. The method of claim 7, wherein the identifier is a license plate number or a quick response (QR) code.

10. A method of providing a notification, a comprising:
detecting, at an electric vehicle supply equipment (EVSE), a first vehicle connected to a charging plug;
providing an electric charge to the first vehicle via the charging plug according to a charging waveform;
detecting that the first vehicle is drawing power according to a communication waveform that is different than the charging waveform;
decoding information from the communication waveform; and
communicating a notification based on the decoded information.

11. The method of claim 10, wherein the decoded information is a vehicle identifier of a second vehicle, wherein the notification is a request to move the second vehicle.

12. The method of claim 11, wherein the second vehicle is parked in tandem with the first vehicle.

13. The method of claim 11, wherein communicating the notification comprises:
determining a mobile device associated with the second vehicle based on the vehicle identifier; and
sending the notification to the mobile device.

14. The method of claim 11, wherein communicating the notification request comprises contacting a valet service to move the second vehicle.

15. The method of claim 10, further comprising:
detecting, at the EVSE, the second vehicle connected to the charging plug; and
providing an electric charge to the second vehicle via the charging plug according to the charging waveform.

16. An electric vehicle comprising:
a vehicle charger that receives, from an electric vehicle supply equipment (EVSE), a charge for the electric vehicle; and
a camera that scans an identifier from a second vehicle parked in tandem with the electric vehicle, wherein the vehicle charger sends, via the EVSE, a notification request including the identifier for the second vehicle.

17. The electric vehicle of claim 16, wherein the vehicle charger draws power from the EVSE according to one or more predefined communication waveforms.

18. The electric vehicle of claim 17, wherein the vehicle charger modulates the one or more predefined communication waveforms based on the identifier.

19. The electric vehicle of claim 16, wherein the vehicle charger determines that the electric vehicle has reached a defined charge level, and wherein the camera scans in response to reaching the defined charge level.

20. The electric vehicle of claim 16, further comprising:
an external light; and
an electronic control unit that turns the external light on while the camera scans the identifier from the second vehicle.

* * * * *